United States Patent [19]

Kuhns et al.

[11] Patent Number: 5,746,878
[45] Date of Patent: *May 5, 1998

[54] VARIABLE EFFECTIVE TEMPERATURE LAMINATOR THERMALBINDER

[75] Inventors: Roger J. Kuhns, Lincoln; Scott Chandler, Acton, both of Mass.

[73] Assignee: Avant Incorporated, Concord, Mass.

[*] Notice: The term of this patent shall not extend beyond the expiration date of Pat. No. 5,716,490.

[21] Appl. No.: 572,894

[22] Filed: Dec. 18, 1995

Related U.S. Application Data

[62] Division of Ser. No. 1,678, Jan. 7, 1993.

[51] Int. Cl.⁶ ............................................. B32B 31/00
[52] U.S. Cl. .................... 156/364; 156/499; 156/555; 156/583.1; 100/93 RP
[58] Field of Search ........................ 156/359, 361, 156/362, 363, 364, 499, 555, 583.1; 100/93 RP, 155 R, 160, 176

[56] References Cited

U.S. PATENT DOCUMENTS

| | | | |
|---|---|---|---|
| 2,224,370 | 12/1940 | Wescott | 156/499 |
| 3,088,379 | 5/1963 | Dickinson et al. | 156/320 X |
| 3,840,420 | 10/1974 | Sarcia | 156/358 |
| 3,994,769 | 11/1976 | Gersbeck | 156/499 |
| 4,102,730 | 7/1978 | Staats | 156/449 |
| 4,310,365 | 1/1982 | Elliott et al. | 156/55 |
| 4,585,510 | 4/1986 | Hajiskakis et al. | 156/555 |
| 4,647,332 | 3/1987 | Ranger | 156/285 |
| 4,818,168 | 4/1989 | Battisti | 412/37 |
| 5,073,076 | 12/1991 | Parkhill | 412/33 |
| 5,234,531 | 8/1993 | Ballestrazzi et al. | 156/359 |
| 5,334,275 | 8/1994 | Romeo et al. | 156/264 |

*Primary Examiner*—James Sells
*Attorney, Agent, or Firm*—Iandiorio & Teska

[57] ABSTRACT

A variable speed, constant temperature laminator including a slot with a terminal portion for receiving perfect binders, rollers for applying heat and pressure to items to be laminated therebetween, a channel for feeding the items to be laminated between the rollers, a heater disposed along a length of the channel terminating in at least one arcuate fin member disposed closely adjacent to and at least partially about the rollers, the heater further includes a thin walled portion proximate the terminal portion of the slot for heating perfect binders received in the slot; and a driver for driving the rollers at variable speeds for maintaining a constant actual temperature for the heater and constant pressure while achieving a variable effective temperature for items passing between the rollers.

21 Claims, 2 Drawing Sheets

5,746,878

VARIABLE EFFECTIVE TEMPERATURE LAMINATOR THERMALBINDER

RELATED CASE

This application is a divisional of U.S. patent application Ser. No. 08/001,678 filed Jan. 7, 1993 entitled, "Method and Laminator for Rapidly Laminating Assorted Plastic Envelopes Having Different Temperature Requirements" by Kuhns.

FIELD OF INVENTION

The present invention relates to a variable effective temperature laminator. And more particularly to such a laminator which varies the speed of items to be laminated while keeping a constant temperature and pressure.

BACKGROUND OF INVENTION

Various types of plastic articles which comprise precut envelopes or pouches for receiving indicia bearing insert sheets therein are laminated by the application of heat and pressure by means of rollers and heating in a laminator. Identification cards and badges, and drivers licenses are common examples of such laminations. Typically, a transparent cover sheet is coupled to a backing sheet and the indicia-bearing insert sheet is positioned between the plastic cover sheet and the backing sheet and the resulting sandwich is passed through a laminator which applies heat and pressure to this envelope to produce the final laminated product. More recently, larger presentation folders are laminated in like manner whereby customized graphic indicia produced by an ordinary personal computer is laminated between a heat activatable plastic cover sheet and half of the presentation folder.

So called "pouch" or envelope laminators are commonly used to perform lamination of these articles. They typically employ a large mass electrical heater positioned between a pair of entrance rollers and a pair of exit rollers. The entrance rollers drive the envelopes through a narrow gap formed in the electrical heater which melts the heat activatable adhesive on the inside surface of the envelopes. The heated envelopes are thereafter passed through the nip of the exit roller pair which performs the final lamination by the application of heat and pressure thereto.

Users of these machines laminate batches of various types of such envelopes, where one batch may require the use of large thick envelopes. These could be the aforesaid 8.5×11.5 inch presentation folders made of paper stock typically having a thickness of 10–12 mils, and three mils of heat-activatable plastic cover sheets attached thereto. Such a batch of presentation folders require a relatively high temperature of exposure produced by the electrical heater since the heat must penetrate the thick 10–12 mil paper presentation folder as it passes through the heater gap.

Immediately after lamination of this first batch, the user may wish to laminate a second batch of wallet-sized ID cards, which call for far lower temperatures since the cards are small and thin. If these thick envelopes are merely passed through the heater just after the lamination of the relatively thick presentation folders without waiting for a long time for the heater to cool down, the heat activatable adhesive and/or latent moisture of fresh photos would tend to boil producing encapsulated bubbling and an unsatisfactory or even ruined lamination would result. This presents a problem to the user of the laminating machine because the cool-down interval in the above example takes as much as thirty to forty minutes and the operator can become impatient and attempt to laminate the second batch at the higher temperature used to laminate first batch, and the ID cards of the second batch would not be properly laminated due to bubbling and the like and can even be ruined. Moreover a customer of the owner of the laminator will not wish to wait up to a half hour required for the cool-down. Furthermore after cool-down there may be another item with a high temperature requirement. Now the user must wait many minutes for the laminator to attain a high temperature. This scenario is especially the case regarding outside printing and laminating service shops. Additionally, the operator would tend to wait and waste time at the machine for it to cool down, or heat up rather than performing another task. This costs the owner money.

SUMMARY OF THE INVENTION

It is therefore an object of this invention to provide an improved laminator, which has an immediate variable effective temperature.

It is a further object of this invention to provide such a laminator which allows a second batch of items to be immediately laminated after lamination of the first batch; even if the first and second batches have quite different temperature requirements.

It is a further object of this invention to provide such a laminator which reduces the dwell time of the envelopes passing through the laminator to prevent the heat activatable adhesive from overheating to spoil the laminations of a second batch of items to be laminated.

It is a further object of this invention to provide such a laminator which does not need a cooling fan to cool the electric control circuits.

This invention results from the realization that prior variable temperature, constant speed laminators suffered from the drawback that the lengthy cool down or heat up waiting period between laminations of items which have different temperature requirements (e.g. lamination of 8½×11 binders as compared to a wallet size driver's license) resulted in inefficiency, poor quality control, poor customer relations, and that if, instead, the operating temperature is kept constant but the roller are driven at variable speeds, the result is a laminator with effective variable temperature abilities without the heat up or cool down waiting periods.

BRIEF DESCRIPTION OF THE DRAWINGS

Other, objects, features and advantages of the present invention will become apparent upon study of the following description taken in conjunction with the drawings in which.

Figure 1:
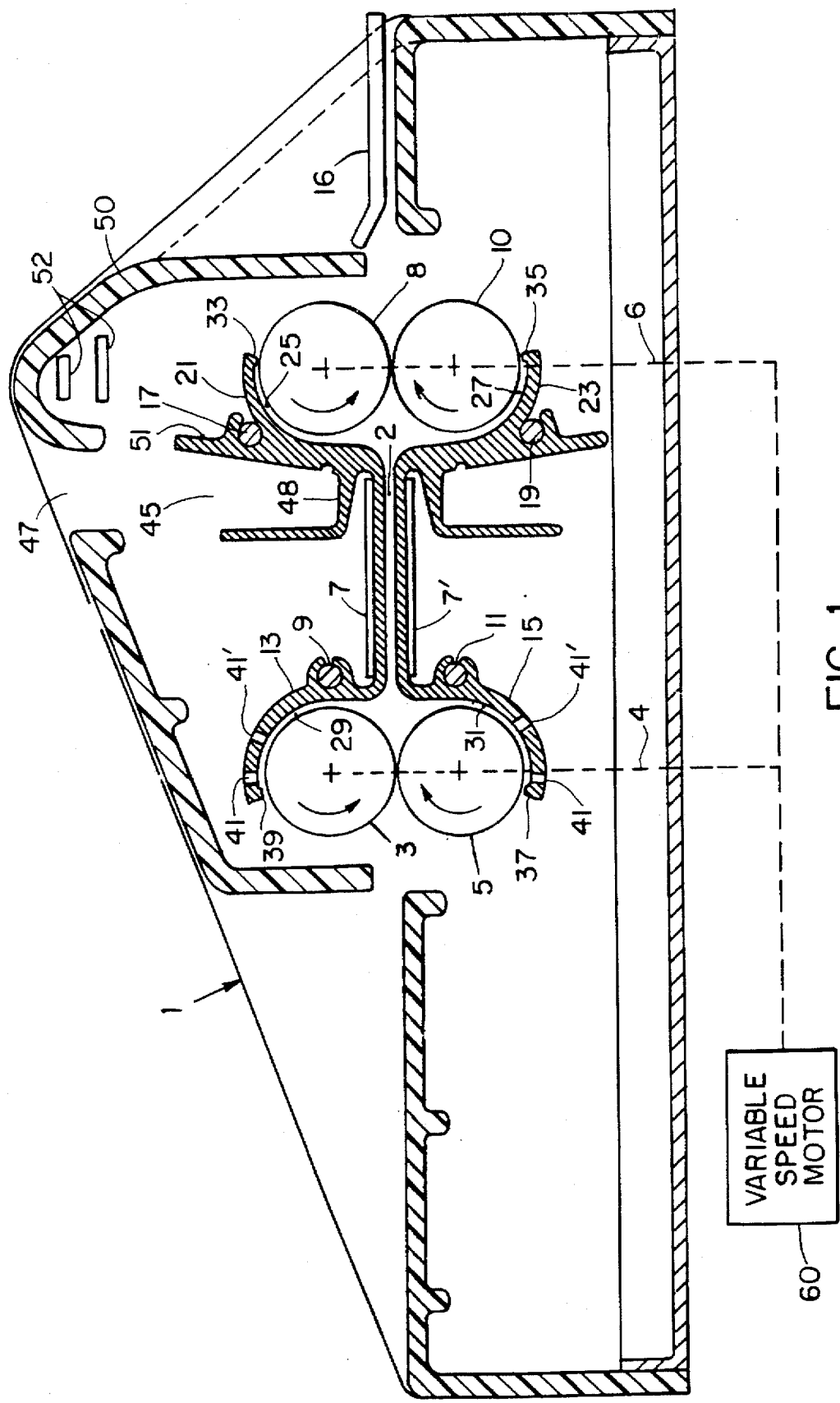
FIG. 1 is a side view of the preferred embodiment of the invention.

There is shown in FIG. 1, a first pair of rollers 3 and 5, within laminator casing 1, which are used to support the envelopes while they are driven through gap 2 formed between the heater platens 7 and 7'. The leading edges of the now heated envelopes thereafter pass through the nip of the second roller pair rollers 8 and 10 which apply additional heat and pressure to produce a laminated product that is cooled by cooling member 16 at the exit portion of the laminator.

Heater platens 7 and 7' employ conventional electrical resistance wiring such as "nichrome" for heating. This invention features a heater structure which is far lighter and far superior to a prior art structure with two central heaters which typically comprise two one pound aluminum heater blocks. In this invention, first heater portion 13 includes a thin arcuate extrusion made of a good heater conductor such as aluminum, and is positioned adjacent to a first roller 3. A gap of about ten mils or less is present between the roller and first heater portion 13. Heat flows from heater platen 7 through the first heater portion 13, across the thin gap 29 and into the roller 3 which could be made of silicone rubber having a low heat conductivity since only the peripheral portion of the roller need be heated. The second roller 5 may have a similar arrangement which includes lower heater portion 15 and gap 31 as shown.

A third heater portion 21 is also formed as a thin arcuate extrusion and is positioned adjacent third roller 8 as shown. Thin arcuate gap, 25 like gap 29, permits substantial heat to flow into the peripheral surface portions of roller 8. A similar arrangement comprises lower roller 10, and gap 27 which may be formed between a fourths lower heater portion 23, and the roller 10.

The first arcuate heater portion 13 and 15 are provided to preheat the pouches passing through the entrance rollers 3 and 5 in order to substantially reduce thermal shock (very abrupt heating) and the resulting interior gas bubbles which may tend to be produced from photos and printed indicia by such thermal shock. In a preferred design, the entrance roller temperature is about 225 degrees F. The second arcuate heater portion 21 and 23 keep the exit roller pair at an elevated temperature which tends to reduce wrinkling and smooths out the lamination process, so that the wrinkles are "ironed out" more effectively and the thermal cool-down shock to the ambient temperature of the surroundings is reduced so that abrupt contraction of the laminae (as high as 1%) is eliminated. In addition, arcuate heater elements 13, 15, 23, and 25 heat rollers 3, 5, 8, and 10 from the outside: A warm roller will be softer and more compliant than a cooler one, which increases the contact area of the rollers within the roller bite in the preferred design.

The first and second arcuate heater portions 13 and 21 respectively, preferably extend along the entire length of the rollers. The first heater portion 13, FIG. 2, extends along the length of the first roller 3, it being understood that the second heater portion 21 extends along the length of roller 8 in like manner. If third and fourth lower heater portions 15 and 23 are provided, they would also preferably extend along the length of lower second and fourth rollers 5 and 10 respectively.

Figure 2:
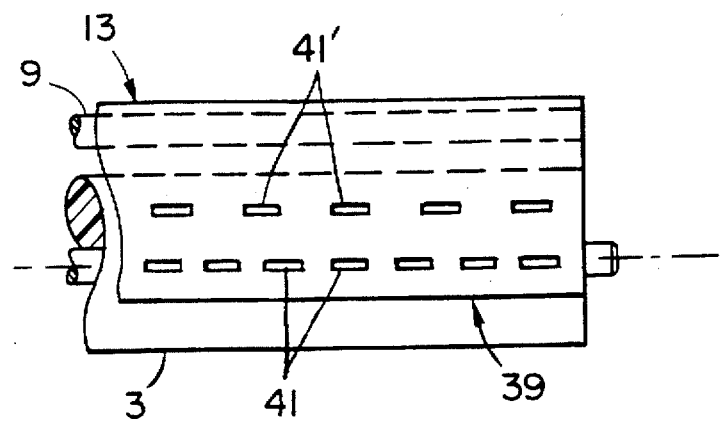
FIG. 2 is a partial plan view of FIG. 1.

The first heater portion 13 has an inwardly extending finger member 39 while the second heater portion 21 has a like member 33. These finger members also extend along the entire length of the roller. (See FIG. 2 illustrating finger member 39). Similar finger members 35 and 37 may be provided at lower heater portions. These members serve to remove any residual previously melted plastic adhesive from the roller surfaces. They may contact the rollers or be slightly separated therefrom.

It is often desirable to be able to adjust the position of the finger members all the way along the length of the rollers. This may be readily accomplished by utilizing ductile metal, such as ductile aluminum, for the arcuate heater portions, and forming slots 41 adjacent the finger members. A screwdriver or similar tool is inserted into the slots 41 and turned to bend the finger portions upwardly or downwardly to change the finger gap. A second row of slots 41 may be formed as shown in FIG. 2 for enabling bending of heater portions away from the finger member 39 to enlarge or diminish the gap 29. This would provide a means for controlling the effective temperature at the heat activatable adhesive. For example, to reduce the temperature of the adhesive, heater portion 13 could be bent upwardly along the entire length thereof by inserting the screw driver into slots 41'. This would increase the width of the insulating air gap 29, to increase thermal impedance, to in turn decrease the flow rate of heat into roller 3. Similar slots 41 and 41' could be formed in the lower heater portion 15. Increasing the gap in this way may also be useful for cleaning the rollers.

It is desirable to eliminate the need for a cooling fan to cool the electronic control circuits. In this invention, this is accomplished by dome 50 located above the heating components and air passage slots 52 therein as shown in FIG. 1. The dome, besides being a portion of the casing for enclosing the laminator components, also now functions as a chimney for convective cooling of the electronic control circuits without the need for a cooling fan. In an alternative models, entrance orifice 47 is absent since there is no provisions for "perfect" edge binding. However, even when slot 47 is present, it is often blocked by the sheets inserted therein being bound, so that hot air will exit through slots 52 to provide the desired cooling without a fan.

As previously discussed the "cool-down" interval of up to forty minutes required to produce good laminations in accordance with currently marketed pouch (envelope) laminators is eliminated in this invention. This is accomplished by a variable speed motor 60 which drives the rollers at a high angular velocity via drive mechanism 4 and 6 just before lamination of a second batch of envelopes, which require a substantially lower temperature for lamination relative to a previously laminated batch. The dwell time within the laminator for this second batch of envelopes is now reduced due to the increased speed of their travel through the laminator. Such reduced dwell time prevents the heat-activatable adhesive from over heating to spoil the laminations of the second batch. As a result, the second batch may be immediately laminated after the first batch rather than waiting for the cooling down of the typical prior art high mass heater which caused inefficient use of labor resources.

After completion of lamination of the second batch of envelopes a third batch, requiring even a higher temperature for proper lamination, may be laminated in short order merely by decreasing the angular velocity of the rollers which in turn increases the dwell time of the pouches within the laminator. This effective change in temperature or dwell time essentially allows for no cool-down time lag.

The heat-up time lag is also effectively removed, due to the laminator of this invention having a low mass of heat shoe assemblies 7 and 7' a warm up time from room temperature to 275 degrees F. of about 1.25 minutes and a warm-up time to 375 degrees F. of 1.75 minutes. A typical prior art pouch laminator model LB-12, marketed by "Banner American" Inc., has with large mass heat shoes corresponding warm-up times of three and four minutes. As a result, operators normally leave such a laminator heated to laminating temperatures all day long rather than waiting these long warm-up periods also wasting substantial amounts of electrical power.

Furthermore, the cool-down time from a given effective laminating temperature to room temperature of 70 degrees F. is as follows for the aforesaid prior art pouch laminator with constant speed and high mass heat shoes without arcuate roller fenders 39, 41 33, 35: forty-one minutes from 375 degrees F.; thirty-five minutes from 325 degrees F; twenty-five minutes from 225 degrees F. In sharp contrast, the cool-down times for the machine of this is a couple of seconds over a wide range of effective temperature 325 degrees F.- 225 degrees F.). This is because the invention employs changes in roller speed and hence dwell time to change the effective laminating temperature of the heat activatable adhesives within the plastic pouches or envelopes. The central portions 7 and 7' of the lower thermal mass heater device stay at a constant temperature of 325 degrees F. plus or minus about 2% which produces a constant temperature of about 280 degrees F. at the aforesaid binding slot 45. The beneficial effect of this constant temperature is that the aforesaid perfect binder timing interval, when the sheets are inserted into slot 45, will be reliable, and the perfect binding will not overheat. Overheating of the heat-activatable "perfect" edge binder strip can cause the hot melt adhesive to run out of the binder receptor slot 45 into the laminator interior, resulting in costly maintenance.

With the one inch diameter silicone rubber rollers of this invention having a length of about 12 inches, an effective temperature of 375 degrees F. in a 70° ambient environment is attained by causing the variable speed motor to drive all four rollers at 8.7 RPM. To obtain effective temperatures of 325, 275, and 225 degrees F., the rollers are driven at 10.4, 12.9, 17.1 RPMs respectively. This solves the aforesaid problem of rapidly laminating different batches of precut envelopes (pouches) having different effective temperature requirements.

This operating flexibility has never been attained before in precut "pouch" laminators before whereby only one single variable—speed control is needed. Lastly, elongated rods 9, 11, 17 and 19 which fit within the heater portion as shown in FIG. 1, can be screwed into side wall portions of the casing and thus function to support the heater portions. They are thus readily removable from the casing to enable disassembly of the components for maintenance purposes.

Figure 3:
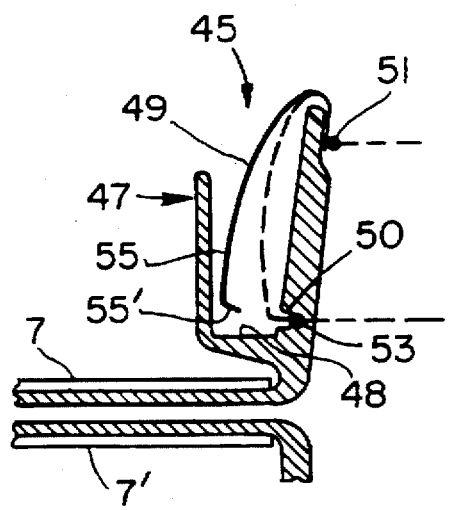
FIG. 3 illustrates the notch and microswitch bow-spring for receiving the perfect binder.

For "perfect" binding, notch 45, FIG. 1, is formed in the upper second heater portion 21, normally along its full width, in order to receive a bundle of sheets, passed through slot 47, to be bound together by the application of heat to form a conventional U-shaped "perfect" binding strip contacting leading edge portions of the sheets. A commonplace example of an edge or "perfect" bind is the top edge portions of a pad of lined paper, wherein the top sheet edges or "signatures" thereof are "glued" to a binder strip perpendicular to the faces of the sheets. The leading edges of the bundle of sheets typically (five to sixty sheets) are inserted into slot 45 via opening 47 and rest against bottom portion 48 a tapered sloped slot without a spring accommodates various width binder strips. Optionally a heated bow spring 49, FIG. 3 also extending across the full width of the heater platen, is displaced to the right to a degree proportional to the number of sheets in the bundle. The result is that the bundle is snugly positioned within the slot, even though the number of sheets being perfectly bound vary, and the edge portions of the sheets are tightly bound together after the heat activatable adhesive of the binder strip is melted and thereafter cooled. In the optional spring notch design of this invention, in contrast with the design of others, both sides and the bottom of the U-shaped binding strip are heated to produce a good bond.

Optionally, bow spring 49 may also function as a resilient switch for initiating operation of a timer which produces an alarm indication after the passage of the appropriate time period for performing the perfect edge binding step. The upper portion of the bow spring 49 is connected to contact 51 and the lower portion of the spring 55 with a bent tip 55' is positioned adjacent contact 53 as shown. After insertion of the bundle of sheets, tip portion 55' of the spring will press against contact 53 to close the switch and thus initiate actuation of the timer. A cavity 50 is provided to prevent snagging of the lower portion of the spring 55.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A variable effective temperature laminator comprising:
 roller means for applying heat and pressure to items to be laminated therebetween;
 a channel for feeding the items to be laminated between the roller means;
 heater means disposed along a length of said channel including a platen terminating in at least one thin arcuate member disposed closely adjacent to and at least partially about said roller means;
 means for driving said rollers at variable speeds for maintaining a constant actual temperature for said heater means while achieving a variable effective temperature for items passing between said roller means; and
 a slot with a terminal portion for receiving perfect binders.

2. The laminator of claim 1 in which the heater means further includes a thin walled portion proximate the terminal portion of said slot for heating perfect binders received in said slot.

3. The laminator of claim 1 in which said thin arcuate member is positioned closely adjacent to the roller means but in a non-contacting relationship therewith to define a gap.

4. The laminator of claim 1 in which said thin arcuate member terminates in an inwardly extending finger member for removing residual previously melted plastic adhesive from said roller means.

5. The laminator of claim 1 in which said slot for receiving perfect binders further includes a resilient bow spring for urging the sheets being bound therein to be biased together within the slot to enhance the perfect binding thereof.

6. The laminator of claim 5 in which said bow spring is heated.

7. The laminator of claim 1 in which said thin arcuate member is made of ductile metal thereby enabling adjustment of the thin arcuate member with respect to the roller means.

8. The laminator of claim 7 in which said thin arcuate member further includes several slots formed therein for receiving a tool for adjusting the thin arcuate member with respect to the roller means.

9. The laminator of claim 1 in which said roller means includes at least opposing first and second rollers.

10. The laminator of claim 9 in which said roller means includes opposing first and second rollers, and opposing third and fourth rollers separated from said first and second rollers along the length of said channel.

11. The laminator of claim 10 in which there is a thin arcuate member disposed proximate at least one of said first and second rollers, and a thin arcuate member disposed proximate at least one of said third and fourth rollers.

12. The laminator of claim 11 in which there is a thin arcuate member disposed proximate each said roller.

13. A variable speed, constant temperature laminator comprising:

roller means for applying heat and pressure to items to be laminated therebetween;

a channel for feeding precut items between the roller means;

heater means disposed along a length of said channel including a platen terminating in at least one thin arcuate member disposed closely adjacent to and at least partially about said roller means; and means for driving said rollers at variable speeds for maintaining a constant actual temperature for said heater means while achieving a variable effective temperature for items passing between said roller means.

14. A variable speed, constant temperature laminator comprising:

roller means for applying heat and pressure to items to be laminated therebetween;

a channel for feeding precut items between the roller means;

heater means disposed along a length of said channel including a portion disposed closely adjacent to and at least partially about said roller means; and means for driving said roller means at variable speeds for maintaining a constant actual temperature for said heater means while achieving a variable effective temperature for items passing between said roller means.

15. The laminator of claim 14 in which said heater means terminates in at least one thin arcuate member disposed closely adjacent to and at least partially about said roller means.

16. A variable speed, constant temperature laminator comprising:

roller means for applying heat and pressure to items to be laminated therebetween;

a channel for feeding precut items between the roller means;

heater means including at least one thin arcuate member disposed closely adjacent to and at least partially about said roller means; and means for driving said roller means at variable speeds for maintaining a constant actual temperature for said heater means while achieving a variable effective temperature for items passing between said roller means.

17. A variable speed, constant temperature laminator comprising:

roller means for laminating items passed therebetween;

heater means for heating the items passed between said roller means; and means for driving said roller means at variable speeds for maintaining a constant actual temperature for said heater means while achieving a variable effective temperature applied to items passing between said roller means.

18. A variable effective temperature laminator comprising:

roller means for applying heat and pressure to items to be laminated therebetween;

a channel for feeding precut items between the roller means;

heater means disposed along a length of said channel including a platen terminating in at least one thin arcuate member disposed closely adjacent to and at least partially about said roller means;

means for driving said rollers at variable speeds for maintaining a constant actual temperature for said heater means while achieving a variable effective temperature for items passing between said roller means; and a slot for receiving perfect binders.

19. The laminator of claim 18 in which said heater means further includes a thinned wall portion proximate a terminal end of said slot.

20. A variable speed, constant temperature laminator comprising:

roller means for applying heat and pressure to items to be laminated therebetween;

a channel for feeding precut items between the roller means;

heater means disposed along a length of said channel including a portion disposed closely adjacent to and at least partially about said roller means;

means for driving said roller means at variable speeds for maintaining a constant actual temperature for said heater means while achieving the variable effective temperature for items passing between said roller means; and a slot for binding perfect binders, said heater means including a thinned wall portion proximate the terminal end of said slot.

21. A variable speed, constant temperature laminator comprising:

roller means for applying heat and pressure to items to be laminated therebetween;

a channel for feeding precut items between the roller means;

heater means disposed along a length of said channel including opposing platens, each platen terminating in at least one thin arcuate member disposed closely adjacent to and at least partially about said roller means; and means for driving said rollers at variable speeds for maintaining a constant actual temperature for said heater means while achieving a variable effective temperature for items passing between said roller means.

* * * * *